(12) United States Patent
Sharma et al.

(10) Patent No.: US 11,619,771 B2
(45) Date of Patent: Apr. 4, 2023

(54) OPTICAL FILMS AND SYSTEMS INCLUDING THE SAME

(71) Applicant: 3M INNOVATIVE PROPERTIES COMPANY, St. Paul, MN (US)

(72) Inventors: Neeraj Sharma, Lake Elmo, MN (US); Guanglei Du, Painted Post, NY (US); John A. Wheatley, Stillwater, MN (US); Matthew E. Sousa, Rosemount, MN (US); Jeremy O. Swanson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 205 days.

(21) Appl. No.: 16/652,996

(22) PCT Filed: Nov. 6, 2018

(86) PCT No.: PCT/IB2018/058721
§ 371 (c)(1),
(2) Date: Apr. 2, 2020

(87) PCT Pub. No.: WO2019/092598
PCT Pub. Date: May 16, 2019

(65) Prior Publication Data
US 2020/0292737 A1    Sep. 17, 2020

Related U.S. Application Data

(60) Provisional application No. 62/582,500, filed on Nov. 7, 2017.

(51) Int. Cl.
*G02B 5/28* (2006.01)
*G02B 5/20* (2006.01)
*G02B 5/26* (2006.01)

(52) U.S. Cl.
CPC .............. *G02B 5/208* (2013.01); *G02B 5/26* (2013.01)

(58) Field of Classification Search
CPC .......... G02B 5/208; G02B 5/26; G02B 5/223; G02B 5/20; G02B 5/22; G02B 5/28
See application file for complete search history.

(56) References Cited

U.S. PATENT DOCUMENTS

| | | | |
|---|---|---|---|
| 4,717,220 A | 1/1988 | Navon | |
| 4,755,012 A * | 7/1988 | Kojima | C08K 5/18 252/299.1 |

(Continued)

FOREIGN PATENT DOCUMENTS

| | | |
|---|---|---|
| JP | 03033173 A | 2/1991 |
| WO | WO 2017-124664 | 7/2017 |

(Continued)

OTHER PUBLICATIONS

International Search report for PCT International Application No. PCT/IB2018/058721 dated Feb. 26, 2019, 3 pages.

*Primary Examiner* — Balram T Parbadia
(74) *Attorney, Agent, or Firm* — Jonathan L. Tolstedt (57) ABSTRACT

Systems including one or both of a light emitter or a light receiver or a detectable object; and an optical filter adjacent one or both of the light emitter or the light receiver, wherein the optical filter includes at least one wavelength transmission selective layer an absorber component, wherein the wavelength transmission selective layer at least partially reduces the transmission of wavelengths from 701 nm to 849 nm incident thereon.

11 Claims, 4 Drawing Sheets

(56) References Cited

U.S. PATENT DOCUMENTS

| | | | |
|---|---|---|---|
| 5,518,810 A | 5/1996 | Nishihara et al. | |
| 6,024,455 A * | 2/2000 | O'Neill | G02B 5/124 |
| | | | 359/530 |
| 6,174,400 B1 * | 1/2001 | Krutak, Sr | G06K 1/121 |
| | | | 427/256 |
| 6,515,811 B2 | 2/2003 | Ikuhara | |
| 7,108,918 B2 | 9/2006 | Yabuki | |
| 2003/0020887 A1 * | 1/2003 | Hasegawa | G02B 5/208 |
| | | | 353/122 |
| 2003/0186040 A1 * | 10/2003 | Oya | H01J 5/08 |
| | | | 428/199 |
| 2007/0267500 A1 * | 11/2007 | Juds | G06K 7/1434 |
| | | | 235/462.32 |
| 2007/0290172 A1 * | 12/2007 | Momose | G02B 5/223 |
| | | | 252/301.16 |
| 2010/0147949 A1 * | 6/2010 | Sakuma | G06K 19/06046 |
| | | | 235/494 |
| 2010/0243970 A1 * | 9/2010 | Toshimitsu | G03F 7/031 |
| | | | 252/582 |
| 2012/0212619 A1 * | 8/2012 | Nagamune | H04N 5/332 |
| | | | 348/E5.09 |
| 2015/0251395 A1 | 9/2015 | Haak | |
| 2015/0317923 A1 * | 11/2015 | Edmonds | G09F 3/0294 |
| | | | 40/541 |
| 2016/0109629 A1 * | 4/2016 | Baloukas | G07D 7/12 |
| | | | 359/582 |
| 2017/0075044 A1 * | 3/2017 | Watanabe | C03C 17/366 |
| 2017/0123122 A1 * | 5/2017 | Ballif | G02B 5/281 |
| 2017/0192144 A1 | 7/2017 | Ooi et al. | |
| 2017/0200035 A1 * | 7/2017 | Teraura | G06K 7/10742 |
| 2017/0318239 A1 * | 11/2017 | Miyasaka | G02B 5/281 |

FOREIGN PATENT DOCUMENTS

| | | |
|---|---|---|
| WO | WO 2017-127734 | 7/2017 |
| WO | WO 2019-092597 | 5/2019 |

* cited by examiner

OPTICAL FILMS AND SYSTEMS INCLUDING THE SAME

BACKGROUND

Optical filters are employed in a wide variety of applications including optical communication systems, sensors, imaging, scientific and industrial optical equipment, and display systems. Optical filters often include optical layers that manage the transmission of incident electromagnetic radiation, including light. Optical filters may reflect or absorb and portion of incident light, and transmit another portion of incident light. Optical layers within an optical filter may differ in wavelength selectivity, optical transmittance, optical clarity, optical haze, index of refraction and various other properties.

SUMMARY

Disclosed herein are wavelength transmission selective layers that at least partially reduce the transmission of wavelengths from 701 nm to 849 nm incident thereon, the wavelength transmission selective layers include an absorber component.

Disclosed herein are systems including one or both of a light emitter or a light receiver; and an optical filter adjacent one or both of the light emitter or the light receiver, wherein the optical filter includes at least one wavelength transmission selective layer including an absorber component, wherein the wavelength transmission selective layer at least partially reduces the transmission of wavelengths from 701 nm to 849 nm incident thereon.

Disclosed herein are articles that include an optical filter, wherein the optical filter includes at least one wavelength transmission selective layer including an absorber component, wherein the wavelength transmission selective layer at least partially reduces the transmission of wavelengths from 701 nm to 849 nm incident thereon.

The above summary is not intended to describe each embodiment of the present disclosure. The details of one or more embodiments of the present disclosure are also set forth in the description below. Other features, objects, and advantages of the present disclosure will be apparent from the description and from the claims.

BRIEF DESCRIPTION OF THE DRAWINGS

The invention may be more completely understood in consideration of the following detailed description of various embodiments of the invention in connection with the accompanying drawings, in which.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In this disclosure, "ultraviolet" refers to wavelengths in a range between about 10 nm and about 400 nm. In this disclosure, "visible" refers to wavelengths in a range between about 400 nm and about 700 nm, and "near-infrared" refers to wavelengths in a range between about 700 nm and about 2000 nm, for example, wavelengths in a range between about 800 nm and about 1200 nm.

Ambient sources of electromagnetic radiation may interfere with receivers configured to receive light of particular wavelengths or from particular sources, or with light emitters configured to emit light of particular wavelengths. For example, visible wavelengths may interfere with receiving, sensing, or transmitting near-infrared wavelengths, for example, by increasing noise in a light receiver or in a light emitter. Sources of electromagnetic radiation may also be unintentionally revealed to onlookers (e.g., human observers who see in the visible range). For example, while light emitted by a light emitter configured to emit only near-infrared wavelengths may not be visibly perceptible, the device or the structure responsible for emitting the light, for example, a housing of the light emitter, may be visibly perceptible. Masking, concealing or otherwise camouflaging the light emitter may present challenges because the camouflage techniques may undesirably result in blocking, interference, or reduction in the transmission of desired near-infrared wavelengths.

Optical filters according to examples of this disclosure may be used to prevent unwanted optical interference from certain wavelengths, or to camouflage sources of electromagnetic radiation from visible perception, while at least partially allowing desired near-infrared wavelengths to be transmitted by a light emitter or received by a light receiver, or while allowing transmission of near-infrared wavelengths with relatively high clarity. For example, a light receiver operating to receive or sense near-infrared wavelengths may be shielded from visible wavelengths, preventing interference with the receiving or sensing of near-infrared wavelengths that may be caused by visible wavelengths. A light transmitter operating to transmit near-infrared wavelengths may be camouflaged against visible perception by scattering visible wavelengths. For example, the scattered visible wavelengths may conceal the presence of the light transmitter, without obstructing the transmission of near-infrared wavelengths.

Disclosed systems may include one or both of a light receiver and a light emitter, and an optical filter that includes a wavelength transmission selective layer that may at least partially reduce the transmission of wavelengths from 701 nm to 849 nm, while at least partially allowing the transmission of other wavelengths. For example, the wavelength transmission selective layer may scatter a majority of incident visible light.

In some embodiments, a layer that at least partially reduces the transmission of wavelengths from 701 nm to 849 nm transmits less than about 50% of incident wavelengths from 701 nm to 849 nm there through, in some embodiments less than about 40% of incident wavelengths from 701 nm to 849 nm are transmitted there through, in some embodiments less than about 30% of incident wavelengths from 701 nm to 849 nm are transmitted there through, in some embodiments less than about 20% of incident wavelengths from 701 nm to 849 nm are transmitted there through, or in some embodiments less than about 15% of incident wavelengths from 701 nm to 849 nm are transmitted there through. In some embodiments the layer that at least partially reduces the transmission of wavelengths from 701 nm to 849 nm blocks at least 20% of wavelengths from 400 nm to 700 nm, in some embodiments at least 50% of wavelengths from 400 nm to 700 nm, in some embodiments at least 80% of wavelengths from 400 nm to 700 nm, in some embodiments about 100% of wavelengths from 400 nm to 700 nm, where wavelengths blocked be absorbed or reflected by the layer.

Disclosed wavelength transmission selective layers may include an absorber component. Wavelength transmission selective adhesive layers can be planar, non-planar or both in a final assembly or article. Wavelength selective layers can be positioned on two-dimensional, three-dimensional, or a combination of both surfaces. Wavelength transmission selective layers can also be modified post formation using techniques including embossing, stretching, in-mold processing, similar types of processes, or combinations thereof.

Absorber components can include a dye or dyes, a pigment or pigments, or combinations thereof. Useful absorber components can include any dye, pigment or combination thereof that can at least partially reduce the transmission of wavelengths from 701 nm to 849 nm, while at least partially allowing the transmission of other wavelengths.

Useful absorber components include those that are soluble in a solvent in the case of a solvent coated composition. Useful absorber components can also include those that do not cause significant NIR scattering.

Illustrative dyes and pigment that can be useful as absorber components in disclosed wavelength transmission selective layers can include those that appear visibly black or colored but are transparent to NIR wavelengths. Visible dyes and colorants fall in one or more classes like Acid Dyes, Azoic coloring matters coupling components and Diazo components. Basic dyes include Developers, Direct dyes, Disperse dyes, Fluorescent brighteners, Food dyes, Ingrain dyes' Leather dyes, Mordant dyes' Natural dyes and pigments, Oxidation bases, Pigments, Reactive dyes, Reducing agents, Solvent dyes, Sulfur dyes, Condense sulfur dyes, Vat dyes. Dyes can also be classified based on the functional group or moiety primarily responsible for the optical absorption. Some of major classes of dyes/pigments include phthalocyanines, cyanine, transitional metal dithioline, squarilium, croconium, quinones, anthraquinones, iminium, pyrilium, thiapyrilium, azulenium, azo, perylene and indoanilines. Many of these dyes and pigments are organic/organometallic or metal organic in nature. Some of these dyes can be metal complexes. A specific group of metal complex dyes are available under the tradename ORASOL® from BASF Color & Effects USA LLC (Florham Park, N.J.). ORASOL® metal complex dyes exhibit relatively high NIR transparency along with strong visible absorption. Illustrative specific dyes include ORASOL® X45, X51 and X55 metal complex dyes (available from BASF Color & Effects USA LLC (Florham Park, N.J.)), which all appear black and have relatively high solubility in useful solvent based adhesives; Lumogen IR788 IR dye (available from BASF Color & Effects USA LLC (Florham Park, N.J.)) is an example of a perylene based dye; Excolor IR10A (available from Nippon Shokubai (Osaka, Japan)); and vanadyl phthalocyanine dye (available either from Afla-Aesar (Tewksberry, Mass.) or Sigma-Aldrich (St. Louis, Mo.)) are phthalocyanine dye and pigments. The colorants which exhibit low solubility can be milled and dispersed as pigment particles in the adhesive or other resin matrix. Some of the organic pigments belong to one or more of monoazo, Azo condensation Insoluble metal salts of acid dyes and diazo, naphthols, arylides, diarylides, pyrazolone, acetoarylides, naphthanilides, phthalocyanines, anthraquinone, perylene, flavanthrone, triphendioxazine, metal complexes, quinacridone, polypryrrole, etc. Mixed metal oxides such as metal chromates, molybdates, titanates, tungstates, aluminates, ferrites, are some of the common pigments. Many contain transition metals like iron, manganese, nickel, titanium, vanadium, antimony, cobalt, lead, cadmium, chromium etc. Bismuth vanadates are non-cadmium yellows. Metal chalcogenides and halides can also be used as pigments. These pigments can be milled to create dispersed nanoparticles which can be useful where low visible and/or NIR scattering is desired.

The amount of an absorber component in a composition or solution to form a wavelength transmission selective layer can depend on a number of factors, including for example the thickness which the layer will be formed, the particular absorber component, other factors, and combinations thereof. In some embodiments that utilize dyes, the composition to form the wavelength transmission selective layer are coated relatively thick (e.g., about 2 mil (about 0.051 mm)) so that a relatively small amount of dye can be utilized. In some embodiments, a composition having not less than 0.1 wt %, not less than 0.2 wt %, or not less than 0.5 wt % dye based on the total weight of the composition can be utilized. In some embodiments, a composition having not greater than 10 wt %, not less than 5 wt %, or not less than 2 wt % dye based on the total weight of the composition can be utilized.

Pigments can also be useful absorber components if they can be sufficiently dispersed in the adhesive, do not cause significant NIR scattering, do not have significant NIR absorption or combinations thereof. In some embodiments, useful pigments can be utilized in nanoparticle form. Both organic and inorganic pigments can be utilized. In some embodiments, useful organic pigments can include some pigments that are commonly utilized in commercially available inks. Specific illustrative organic pigments that can be utilized can include, for example, an organic quinacridone pigment, MICROLITH® Magenta 4500J; an organic phtalocyanine pigment, MICROLITH® Green 8750K; and an organic phthalocyanine pigment, MICROLITH® Blue 7080KJA, which are both available from BASF Color & Effects USA LLC (Florham Park, N.J.). Specific illustrative inorganic pigments that can be utilized can include, for example ceria nanoparticles (available from Nyacol, Ashland, Mass.).

Dyes can also be useful absorber components. Different dyes have different absorption coefficients, but pigments on the other hand exhibit both absorption and scattering and therefore the optical properties of pigments are described by extinction coefficients. The particle size of a pigment has a strong impact on its scattering behavior. Pigments with particle sizes in the nanometer size range display a relatively significantly reduced scattering. The amount of a dye or pigment (or combination) in a composition that forms a layer or the layer itself can be determined using such optical characteristics. For a given coating thickness the loading of dyes or pigments is inversely proportional to their absorption/extinction coefficients. For a given transmission the loading or concentration of pigment/dye is dependent on thickness and extinction/absorption coefficient of the layer. Beer-Lambert's law can be used to calculate the concentration required for a given transmission if the absorption coefficient is known. This law works well in dilute solutions but may have limitations at higher concentrations due to scattering, fluorescence, etc.

In some embodiments, compositions to form wavelength transmission selective layers can be dispensed on (e.g., printed on, etc.) a substrate. Printing can be done using such processes as screen-printing, slot-die coating, and even ink-jet printing. Wavelength transmission selective layers can be formed by applying or dispensing a composition onto a substrate. Illustrative useful substrates can include various types of substrates depending in part on the desired use of the wavelength transmission selective layer to be formed. In some embodiments, useful substrates can include polyesters such as polyethylene terephthalate (PET).

In some embodiments, wavelength transmission selective layers at least partially allow the transmission of wavelengths from 701 nm to 849 nm. In some embodiments wavelength transmission selective layers at least partially reduce the transmission of wavelengths from 701 nm to 849 nm and at least partially reduce the transmission of wavelengths from 350 nm to 700 nm so that the wavelength transmission selective layers at least partially reduces the transmission of wavelengths from 350 nm and 849 nm.

In some embodiments, wavelength transmission selective layers reduce the transmission of wavelengths from 701 nm to 849 nm by at least 50%, at least 40%, at least 30%, at least 20%, or at least 15%. In some embodiments, wavelength transmission selective layers need not reduce all wavelengths from 701 nm to 849 nm by the same amount and a percent reduction is measured by spectrometer as a wavelength of light through the wavelength transmission selective layer(s) from 701 nm to 849 nm over the wavelength of light through the wavelength transmission selective layers without an absorber component(s) from 701 nm to 849 nm.

In some embodiments, wavelength transmission selective layers can be made of or include more than one layer, e.g., they can be a multilayer film or structure. In some instances, multilayer films may be advantageous for ease of handling and application. For example, a stiffer elastic layer combined with a softer more viscous layer may facilitate converting the article into die cuts, or it can allow coverage of a three-dimensional feature, such as an ink step, easier when the soft, more viscous layer is positioned adjacent to such a three-dimensional feature. Multilayer films may also be advantageously utilized to more easily modify the optical density of the film (for example for a given total thickness of the layer a clear layer can be utilized to reduce the optical density of another layer positioned above or below the clear layer); or the visible appearance of the film (for example one layer may be green, while a second is blue to give the appearance of a composite color of both).

Wavelength transmission selective layers can also be used adjacent one or more detectable objects. A detectable object can be one that reflects NIR wavelengths, for example. In some embodiments, the detectable object can be one that is a retroreflector that reflects NIR (or otherwise) wavelengths in response to one or more wavelengths of light impinging thereupon.

The wavelength transmission selective layers can be used proximate any component in an optical article. Such optical articles can be referred to as optical filters. FIGS. 1A-1E are lateral cross-sectional views of example articles including optical filters.

Figure 1A:
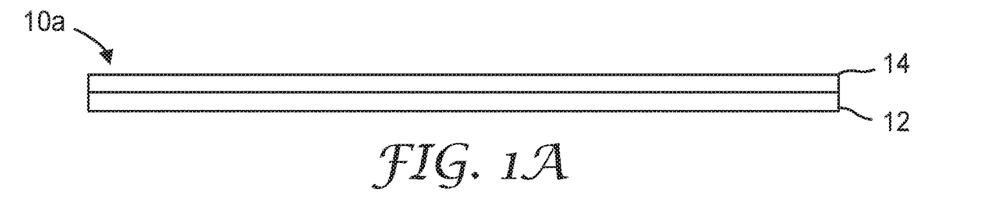
FIGS. 1A to 1E show various patterns of retroreflective elements included in the presently disclosed optical articles.

FIG. 1A shows a lateral cross-sectional view of example article 10a. Article 10a includes a substrate 12 and a wavelength transmission selective layer 14. The substrate 12 may include glass, polymer, metal, or any other suitable rigid, semi-rigid, or soft maters, and combinations thereof. While the substrate 12 is shown as a layer in the example article 10a of FIG. 1A, in examples, substrate 12 may assume any suitable three-dimensional shape that may have a flat, a substantially flat, or a textured surface. In examples, substrate 12 may include a housing, a screen, or a surface of a device, for example, an electronic device.

The wavelength transmission selective layer 14 at least partially reduces the transmission of wavelengths from 701 nm to 849 nm. In examples, the wavelength transmission selective layer 14 may transmit less than about 50% of wavelengths from 701 nm to 849 nm. wavelength transmission selective. In examples, the wavelength transmission selective layer 14 may transmit less than about 50% of wavelengths from 701 nm to 849 nm, and transmit less than about 50% of wavelengths below 700 nm. In examples, the wavelength transmission selective layer 14 may scatter greater than about 50% of wavelengths below 700 nm. For example, the wavelength transmission selective layer 14 may transmit less than about 50% of incident wavelengths below 700 nm by scattering more than about 50% of incident wavelengths below 700 nm.

Figure 1B:
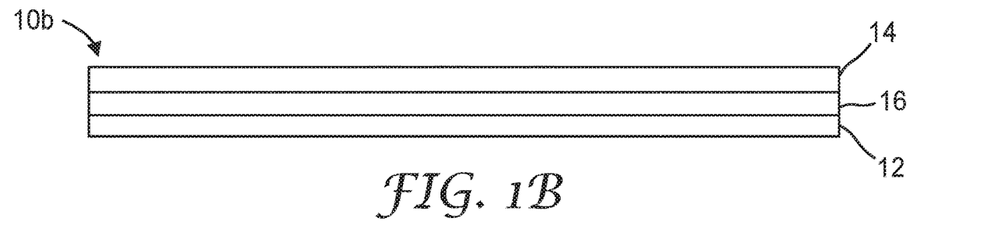

FIG. 1B shows a lateral cross-sectional view of example article 10b. Article 10b may include the substrate 12, the wavelength transmission selective layer 14, and a reflective layer 16. While reflective layer 16 is shown between the wavelength transmission selective layer 14 and the substrate 12 in article 10b, in examples, article 10b may not include the substrate 12, and the wavelength transmission selective layer may be disposed on the reflective layer 16. In examples, substrate 12 may include the reflective layer 16, for example, at a major surface or within an interior of substrate 12. In examples, the reflective layer 16 may be disposed below the substrate 12. In examples, the reflective layer 16 may be disposed above the substrate 12. In examples, the reflective layer 16 may be perforated. In examples, article 10b may reflect less than 50% of visible light, and transmit more than 50% of near-infrared light. In examples, reflective layer 16 may be wavelength selective, for example, reflecting only selected wavelengths. Reflective layer 16 may include a multilayer optical film, a dichroic reflector, an interference film, an inorganic multilayer stack, a metal dielectric stack, a polished substrate, a mirror, a reflective polarizer, or a reflective surface such as a reflective metal or glass surface. In examples, article 10b may include a dye layer (not shown) between the reflective layer and the wavelength transmission selective layer 14, or above the wavelength transmission selective layer 14, or positioned adjacent any layer in article 10b. The dye layer may include a spectrally selective dye that may be transmissive or clear in near-infrared, and absorptive in the visible, such that it reduces the visible reflection of the reflective layer 16. In examples, the dye layer may have at least 30%, 50%, 70%, or 90% visible light absorption. In examples, the dye layer could be colored, so that it has a visible color, while remaining transmissive in near-infrared.

Figure 1C:
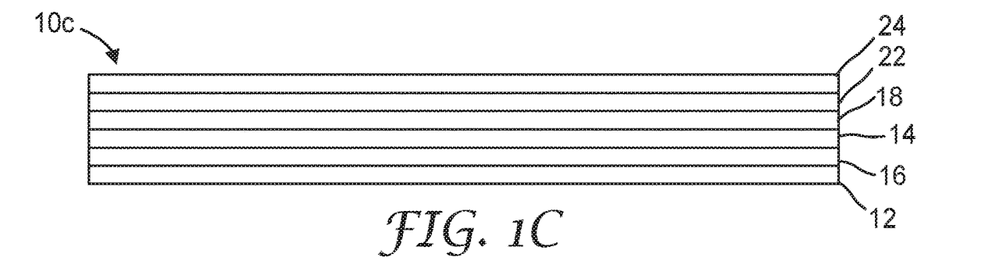

FIG. 1C shows a lateral cross-sectional view of example article 10c. Article 10c may include the substrate 12 and the wavelength transmission selective layer 14. Article 10c may optionally include one or more of the reflective layer 16, an ink receptive layer 18, a printed pattern layer 22, and a protective layer 24, as shown in FIG. 1C. While FIG. 1C shows a particular arrangement for layers in article 10c, the respective layers may be rearranged in any suitable configuration. For example, substrate 12 may be omitted when the reflective layer 16 is present. The protective layer 24 may include a sealant layer. In examples, the inked pattern layer 22 includes a printed pattern of ink or pigment that may be deposited on the ink receptive layer 18. In examples, the ink receptive layer may be omitted, and the inked pattern layer 22 may be deposited on the wavelength transmission selective layer 14. In examples, the protective layer 24 may be disposed between the inked pattern layer 22 and the wavelength transmission selective layer 14. In examples, two protective layers 24 may be disposed, one above the inked pattern layer 22, and another adjacent the wavelength transmission selective layer 14.

Figure 1D:
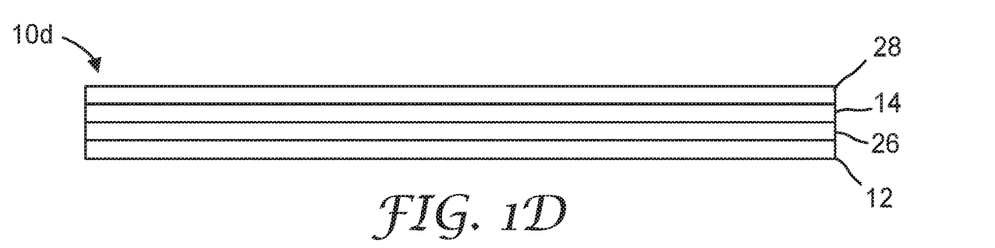

FIG. 1D shows a lateral cross-sectional view of example article 10d. Article 10d may include the substrate 12, the wavelength transmission selective layer 14, a first sealant layer 26 and a second sealant layer 28. One of both of the first sealant layer 26 and the second sealant layer 28 may include a latex coating. The respective sealant layers, may protecting the integrity of the wavelength transmission selective layer 14, for example, by preventing or reducing the intrusion of moisture or other reactants or disintegrants. The respective sealant layers may also provide structural support and physical stability to the wavelength transmission selective layer 14. For example, one or both of the first sealant layer 26 and the second sealant 28 may allow the wavelength transmission selective layer 14 to be peeled off or removed from a manufacturing substrate and then transported to and applied over a product substrate, for example, over substrate 12.

Figure 1E:
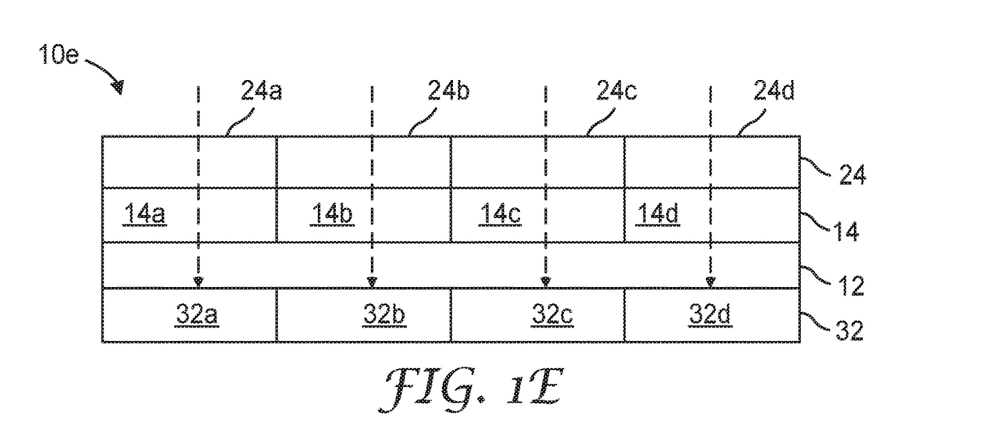

FIG. 1E shows a lateral cross-sectional view of example article 10e. Article 10e may include the substrate 12, the wavelength transmission selective layer 14 adjacent the substrate 12, and an inked pattern layer 24 deposited on the wavelength transmission selective layer 14. A sensor layer 32 including respective sensor segments 32a, 32b, 32c, and 32d may be disposed adjacent the substrate 12. In examples, the substrate 12 may be omitted, and the wavelength transmission selective layer 14 may be deposited on the sensor layer 32. In examples, the wavelength transmission selective layer 14 may include respective selective scattering segments 14a, 14b, 14c, and 14d that may be aligned with respective sensor segments 32a, 32b, 32c, and 32d. One or more of the selective scattering segments may be omitted, so that the wavelength transmission selective layer 14 may include at least one perforation that may be aligned with at least one of the respective sensor segments. Thus, different selective scattering segments may be tuned by changing the near-infrared scattering ratio, the visible haze ratio, or other optical properties that may improve the performance of the sensor segment aligned with the respective selective scattering segment. While four segments are shown in the wavelength scattering layer 14 and the sensor layer 32 of FIG. 1E, in examples, the wavelength scattering layer 14 and the sensor layer 32 may have any suitable number of segments. While sensor layer 32 is described in the example of FIG. 1E, in examples, article 10e may include light sources 32a, 32b, 32c, and 32d instead of sensor segments.

While FIGS. 1A-1E show respective articles 10a-10e as including flat layers, in various examples, articles 10a-10e may assume any suitable shape, periphery, or cross-section, and layers in articles 10a-10e may assume a regular, irregular, or compound curvature, or may assume flat or curved geometries in different regions, or otherwise conform to a contour of a substrate beneath the layers or the articles 10a-10e. For example, articles 10a-10e may assume a hemispherical or lenticular shape.

Optical articles including wavelength transmission selective adhesive layers can be utilized in various systems, including optical systems for example. Such optical filters can be utilized proximate to or adjacent to any portion or portions of an optical system. For example, optical filters can be utilized proximate a light source, a detector, an object being detected, or any combination thereof, for example. In some embodiments, where an optical article is used proximate an objected to be detected, a reflector can be included in the optical article or proximate the optical article. Illustrative reflectors can include specular reflectors, diffuse reflectors, semi-specular reflectors, retroreflective reflectors, or any combination thereof. Illustrative retroreflectors can include both beaded and cube corner retroreflective articles and either metal backed or air backed. In some embodiments, optical filters can be located proximate, integral to, or both a light delivery device including for example a light fiber or a hollow or solid light guide.

Figure 2A:
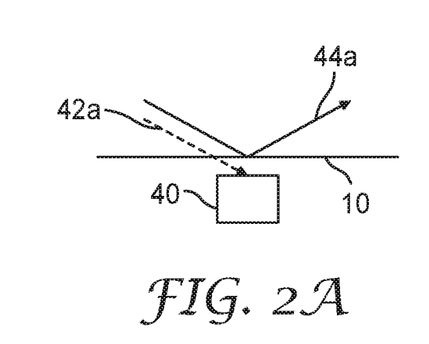
FIGS. 2A to 2E are conceptual and schematic diagrams of example optical systems including an optical filter.

FIGS. 2A-2E are conceptual and schematic diagrams of example optical systems including an optical filter. FIG. 2A is a conceptual and schematic diagrams of an example optical system including an optical filter 10 and a light receiver 40. In examples, the light receiver 40 may include a light sensor, camera, CCD, or any other sensor configured to sense at least a predetermined wavelength region of light. For example, light receiver 40 may include a near-infrared sensor. In examples, the light receiver 40 may include an object that receives light, for example, a solar cell, or an object that at least partially absorbs incident light, for example, a solar heater or any other object that receives light. The optical filter 10 may include any of the example optical filters including a wavelength transmission selective layer, as discussed above with reference to FIGS. 1A-1E, or other example optical filters described in the disclosure. As shown in FIG. 2A, the optical filter 10 may be disposed adjacent the light receiver 40. An incident near-infrared ray 42a may include a near-infrared wavelength, and may be substantially transmitted through the optical filter 10 to the light receiver 40. An incident visible ray 44a may include a visible wavelength and may be substantially reflected or scattered by the optical filter 10, so that the light receiver 40 is at least partially shielded from the visible ray 44a, while at least partially receiving the near-infrared ray 42a. In examples, the light receiver may be substantially or completely shielded from the visible ray 44a by the optical filter 10, and may receive substantially all of near-infrared ray 42a.

Figure 2B:
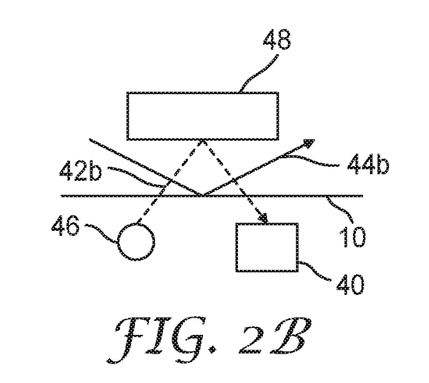

FIG. 2B is a conceptual and schematic diagrams of an example optical system including the optical filter 10, the light receiver 40, a light emitter 46, and an object 48. In examples, the light emitter 46 may include a source of any suitable wavelength of light or electromagnetic radiation, including visible, near-infrared, or ultraviolet wavelengths. In examples, the light emitter 46 may include a bulb, an incandescent light source, compact fluorescent light, LEDs, a light guide, or any natural or artificial sources of light. In examples, the light emitter 46 may not generate light, and may only reflect or transmit light generated by a light source. The optical filter 10 may be disposed between the light receiver 40 and the object 48. The light emitter may be disposed on the same side of the optical filter 10 as the light receiver 40. A near-infrared ray 42b transmitted from the light emitter 46 may include a near-infrared wavelength, and may be substantially transmitted through the optical filter 10 to the object 48. The ray 42b may be reflected back by the object 48, and the reflected ray may be modified by the optical properties of the object 48. The reflected ray 42 may be substantially transmitted through the optical filter 10 to the light receiver 40. An incident visible ray 44b may include a visible wavelength and may be substantially reflected or scattered by the optical filter 10, so that one or both of the light receiver 40 and the light emitter 46 are at least partially shielded from the visible ray 44a. In examples, the light receiver may be substantially or completely shielded from the visible ray 44b by the optical filter 10, and may receive substantially all of the near-infrared ray 42b.

Figure 2C:
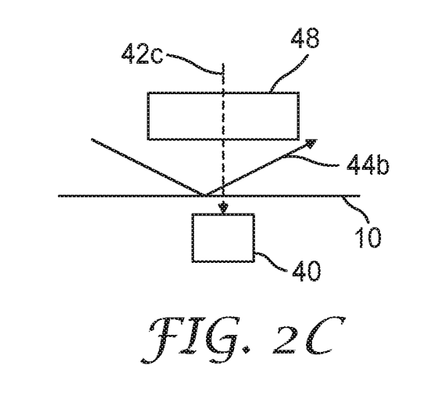

FIG. 2C is a conceptual and schematic diagrams of an example optical system including the optical filter 10, the light receiver 40, and the object 48. The optical filter 10 may be disposed between the light receiver 40 and the object 48. An incident near-infrared ray 42c may include a near-infrared wavelength, and may be substantially transmitted through the object 48 and the optical filter 10 to the light receiver 40. An incident visible ray 44c may include a visible wavelength and may be substantially reflected or scattered by the optical filter 10, so that the light receiver 40 is at least partially shielded from the visible ray 44c, while at least partially receiving the near-infrared ray 42c. In examples, the light receiver 40 may be substantially or completely shielded from the visible ray 44c by the optical filter 10, and may receive substantially all of the near-infrared ray 42c.

Figure 2D:
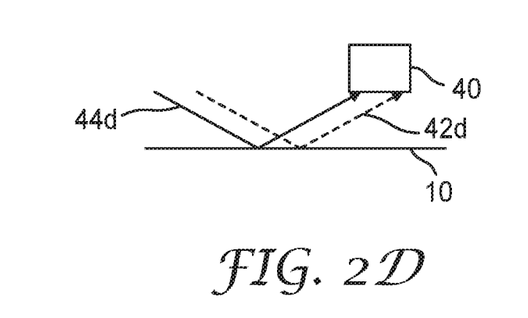

FIG. 2D is a conceptual and schematic diagrams of an example optical system including the optical filter 10 and the light receiver 40. The optical filter 10 may be disposed adjacent the light receiver 40. An incident near-infrared ray 42d may include a near-infrared wavelength, and may be substantially reflected off the optical filter 10 to the light receiver 40. An incident visible ray 44d may include a visible wavelength and may be substantially reflected or scattered by the optical filter 10, so that the light receiver 40 at least partially receives the visible ray 44d, while at least partially receiving the near-infrared ray 42d.

Figure 2E:
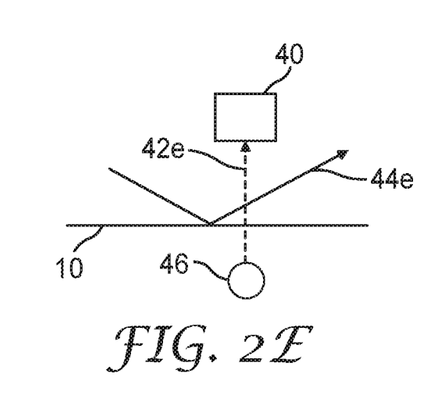

FIG. 2E is a conceptual and schematic diagrams of an example optical system including the optical filter 10, the light receiver 40, and the light emitter 46. The optical filter 10 may be disposed between the light emitter 46 and the light receiver 40. A near-infrared ray 42e transmitted from the light emitter 46 may include a near-infrared wavelength, and may be substantially transmitted through the optical filter 10 to the light receiver 40. An incident visible ray 44e may include a visible wavelength and may be substantially reflected or scattered by the optical filter 10, so that the light emitter 46 is at least partially shielded from the visible ray 44e. In examples, the light emitter 46 may be substantially or completely shielded from the visible ray 44e by the optical filter 10. While the light receiver 40 is described in the example optical system of FIG. 2E, in examples, the example optical system of FIG. 2E may not include a light receiver 40. For example, the example optical system may include the light emitter 46 and the optical filter 10, and the optical filter 10 may conceal the light emitter 46 from visible appearance.

In examples, the optical filter 10 may include at least one removable or repositionable layer, or optical filter 10 as a whole may be removable or repositionable, so that it can be removed or repositioned relative to a substrate underneath or adjacent the optical filter 10. In examples, the periphery of the optical filter 10 may extend beyond the periphery of one or both the light emitter 46 or the light receiver 40, or the area of a major surface of the optical filter 10 may be greater or smaller than a surface area of one or both of the light emitter 46 or the light receiver 40. In examples, the optical filter 10 may be configured to camouflage other components, such as electronics, circuitry, substrates, sensors, transmitters by shielding those components by the optical filter from a visual perception. In examples, more than one light emitter 46 or light receiver 40, for example, an array, could be positioned adjacent the optical filter 10. In examples, one or both of the light emitter 46 or the light receiver 40 may be relatively remote from the optical filter 10, for example, at least 1 cm away, or 10 cm away, or 1 m away or, 10 m away, or 100 m away, or 1 km away, or even further remote. While a direct path for light is shown in FIGS. 2A-2E, for example, between one or both of the light emitter 46 and the light receiver 40 and the optical filter 10, in examples, light between one or both of the light emitter 46 and the light receiver 40 and the optical filter 10 may follow indirect paths, including optically guided paths, reflected paths, or paths including optical manipulation including refraction or filtering, or paths that travel through different optical media.

Thus, in examples, the optical filter 10 may be configured to at least partially shield the light receiver 40 from visible wavelengths while substantially allowing the light receiver 40 to receive near-infrared wavelengths. In examples, the optical filter 10 may be configured to camouflage one or both of the light receiver 40 or the light emitter 46 from a visual perception, for example, by scattering visible wavelengths.

Figure 3A:
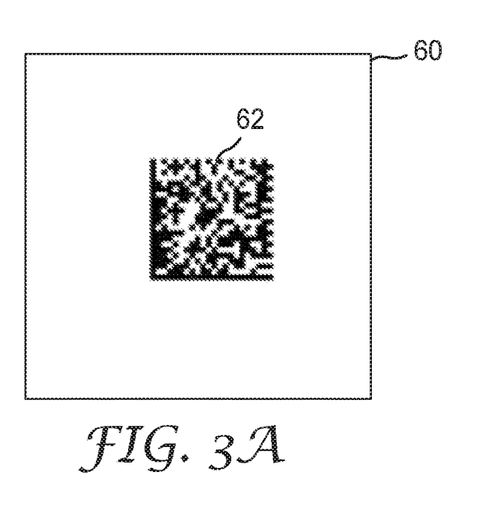
FIGS. 3A to 3D are conceptual diagrams of an example system including an example optical filter and an electronic display displaying a visibly perceptible pattern and an invisible near-infrared pattern.
Figure 3B:
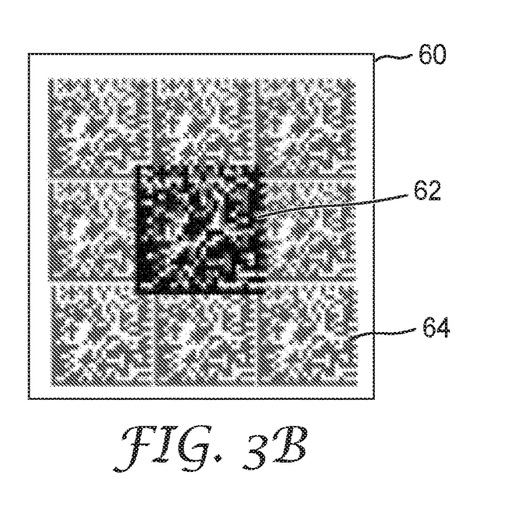
Figure 3C:
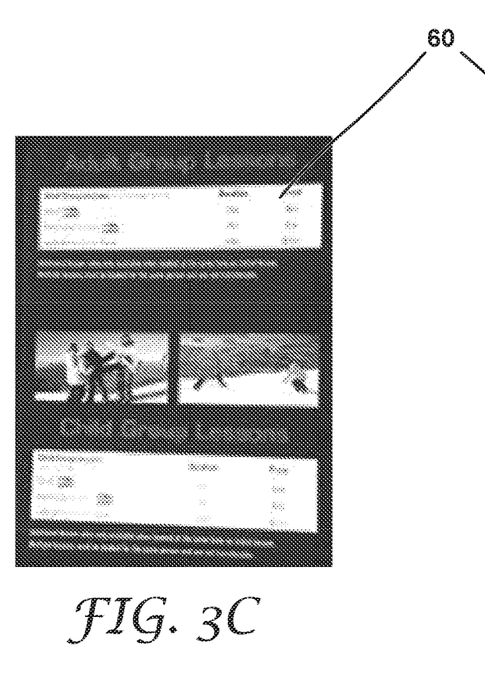
Figure 3D:
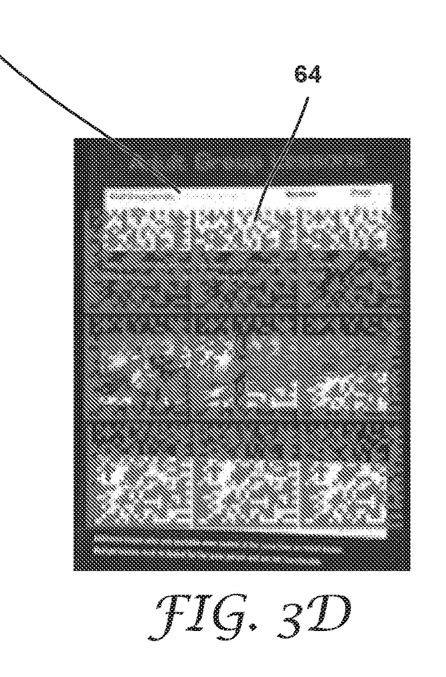

FIGS. 3A-3D are conceptual diagrams of an example system including an example optical filter and an electronic display displaying a visibly perceptible pattern and an invisible near-infrared pattern. Since imaging sensors such as charge-coupled devices (CCD) detect in the near-infrared region, it would be possible to produce a sign including a visibly reflective graphic. The sign could conceal an invisible image that is detectable by the camera. For example, the image could include a predetermined pattern that encodes a signal or information, such as a bar code, a 2D bar code, or a QR code. The physical size of QR codes may limit the amount of information they may contain. However, an invisible QR code could be physically as large as the sign without cluttering or compromising the visible graphic. In an example, an electronic display 60 may be capable of simultaneously displaying visible and near-infrared patterns emitted by respective visible and near-infrared light emitters concealed behind the display 60. The electronic display 60 may be covered with an example optical filter described above with reference to FIGS. 1A-1E. For example, the electronic display 60 may simultaneously display a pattern 62 that is visible and an invisible near-infrared pattern 64, as shown in FIG. 3B. The pattern 62 may include a relatively smaller QR code or other indicia with a relatively smaller display footprint, while the pattern 64 may include a relatively larger QR code or other indicia with a relatively larger footprint. The pattern 62 may be visible as a result of reflection or scattering of visible wavelengths by the optical filter (not shown). As seen in FIG. 3A, only pattern 62 may be visibly perceived, and pattern 64 may remain invisible to visual perception, while being presented with relatively high clarity in near-infrared wavelengths. A camera capable of sensing near-infrared wavelengths may thus sense pattern 64 with sufficient resolution, for example, with a resolution sufficient to decode information that may be contained in pattern 64. In the example shown in FIG. 3C only a predetermined pattern may be visibly perceptible on display 60, while an invisible near-infrared pattern only detectable by a near-infrared camera may be simultaneously displayed on the display 60, as shown in FIG. 3D. Thus, in the respective example systems of 3A and 3B, and 3C and 3D, an example optical filter may be used to conceal or camouflage a source of a near-infrared pattern while revealing only a predetermined visible pattern. In some examples, the invisible near-infrared patterns 64 may be used to encode concealed information, while the visibly perceptible patterns 62 may be used to present visibly perceptible information, or at least information that may be encoded, but is visibly perceptible as being encoded. For example, pattern 62 may encode a first set of information, such as a website, while pattern 64 may encode a second set of information, such as a location of the display 60. In examples, the electronic display 60 may display a visible pattern, an invisible pattern, or both. In examples, the electronic display 60 may display multiple patterns. In examples, the electronic display may display static patterns or dynamic patterns. Thus, example optical filters may provide camouflage with high clarity near-infrared transmission.

Figure 4:
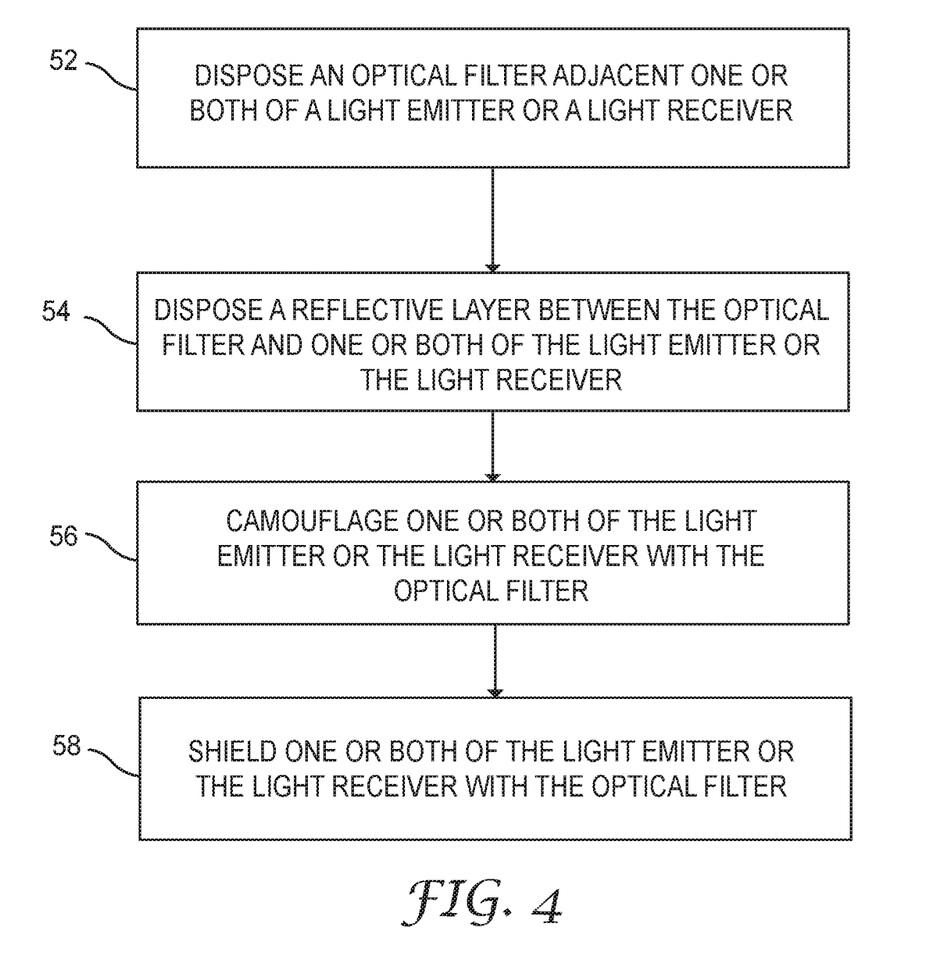
FIG. 4 is a flowchart of an example technique.

FIG. 4 is a flowchart of an example technique. The example technique may include disposing an optical filter 10 adjacent one or both of the light emitter 46 or the light receiver 40 (52). The optical filter 10 includes a wavelength transmission selective layer, as discussed above with reference to FIGS. 1A-1E and FIGS. 2A-2E. The example technique may optionally further include disposing the reflective layer 16 between the optical filter 10 and one or both of the light emitter 46 or the light receiver 40 (54). The optical filter 10 may optionally camouflage one or both of the light emitter 46 or the light receiver 40 (56). The optical filter 10 may optionally at least partially shield one or both of the light emitter or the light receiver from visible wavelengths (58).

Thus, example systems, articles, and techniques according to the present disclosure may include example optical articles including example wavelength transmission selective layers that transmit near-infrared light with relatively high clarity while reducing the transmission of visible wavelengths, for example, by selectively scattering, absorbing, or reflecting visible wavelengths. All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising" and the like. For example, a composition that "comprises" silver may be a composition that "consists of" silver or that "consists essentially of" silver.

As used herein, "consisting essentially of" as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects is present. For example, a "second" substrate is merely intended to differentiate from another substrate (such as a "first" substrate). Use of "first," "second," etc. in the description above and the claims that follow is also not necessarily intended to indicate that one comes earlier in time than the other.

Example articles and techniques according to the disclosure provide will be illustrated by the following non-limiting examples.

TABLE 1

| Designation | Description | Source |
| --- | --- | --- |
| MEK | Methyl ethyl ketone, solvent | EMD Chemicals ( |
| Orasol Black X55 | Visible absorbing black dye | BASF Color & Effects USA LLC, Florham Park, NJ |
| IR 788 | IR Dye | BASF Color & Effects USA LLC, Florham Park, NJ |
| Paraloid B66 | Powder form | Rohm & Haas (now Dow Chemicals) |
| Paraloid B66 | 55 wt % in toluene | Dow Chemical |
| NSC61 | Screen ink | Nazdar Inks |
| RE195 | | Nazdar Inks |
| YS-7 | IR Transparent tinted PET Films | 3M Company, Inc. (St. Paul, MN) |
| YS-35 | IR Transparent tinted PET Films | 3M Company, Inc. (St. Paul, MN) |
| CP-20 | Tinted PET Film | Cyclops |

Test Methods

The total and diffuse visible (400-700 nm) and NIR (800-1000 nm) transmission, were measured using a spectrometer (Hunterlab Ultrascan Pro) at 5 nm interval. Percent Transmission (% T) at 365 nm, 475 nm, 525 nm, 650 nm, 700 nm, 750 nm, 800 nm, 850 nm 875 nm, 900 nm, 940 nm and 975 nm for Examples 1 to 7 has been reported in Table 2 below.

Coating Solutions

Coating Solution 1: 9 gm of Nazdar NSC61 was diluted with 7 grams of Thinner/screen wash RE195 Nazdar to make a diluted screen ink or Coating solution 1.

Coating Solution 2: 210 grams of Paraloid B66 was dissolved in 210 grams of MEK at 60° C. in closed glass jar. 75 gm of Orasol Black X55 was dissolved in 300 grams of MEK. Orasol Black X55 solution was added to the Paraloid B66 solution in MEK (made as above) to prepare Coating solution 2.

\Coating Solution 3: 1 gm of 10 wt % IR 788 dissolved in toluene was added to 2 gm of coating solution 2 to make coating solution 3

Example 1

Coating Solution 1 was coated on a tinted PET (YS-7) film with a #20 Meyer Rod. The coated sample was dried in an oven at 70° C. for 5 minutes after which it was left to air dry for 1 day.

Example 2

Coating Solution 1 was coated on a tinted PET film (YS-35) with a #20 Meyer Rod. The coated sample was dried in an oven at 70° C. for 5 minutes after which it was left to air dry for 1 day.

Example 3

Coating Solution 1 was coated on a tinted PET film (CP-20) with a #20 Meyer Rod. The coated sample was dried in an oven at 70° C. for 5 minutes after which it was left to air dry for 1 day.

Example 4-6

Coating Solution 2 was coated on a YS-7 film (5 inch wide) at a coater with three different coating weights 12, 8 and 4 cc/min at a coated width of 4 inches. The coated web was dried in a series of ovens at 100°, 110° and 140° F. The optical Density of the coated films for Examples 4, 5, and 6 was measured as 5.4, 4.5 and 3.4 respectively.

Example 7

Coating Solution 3 was coated on a tinted PET film (YS-7) with a #20 Meyer Rod. The coated sample was dried in an oven at 70° C. for 5 min after which it was left to air dry for 1 day. The total transmission and diffuse transmission for the coated films in Examples 1-6 were measured using a Hunterlab Ultrascan Pro spectrometer. The ratio of the diffuse transmission to total transmission at 940 nm was used to calculate the IR scattering ratio at 940 nm. FIG. 5 shows the total transmission spectra for the coated samples. Table 2 shows the specular at transmission at 940 nm and IR scattering ratio (percent) at 940 nm. The measurements indicate that the films exhibit high visible light blocking, high NIR transmission which is tunable and has very low diffuse NIR scattering at 940 nm as evident from the NIR scattering ratio of diffuse transmission/total transmission at 940 nm which is less than 1%.

TABLE 2

| Sample Name | IR Transmission (Specular) 940 nm | IR Scattering Ratio % (Trans) 940 nm |
|---|---|---|
| YS-7 Uncoated | 87.8 | 0.82 |
| Example 1 | 86.2 | 0.61 |
| YS-35 Uncoated | 89.1 | 0.67 |
| Example 2 | 86.7 | 0.74 |
| CP-20 Uncoated | 88.8 | 0.96 |
| Example 3 | 86.6 | 0.92 |
| Example 4 | 83.8 | 0.82 |
| Example 5 | 86.1 | 0.45 |
| Example 6 | 86.7 | 0.36 |
| Example 7 | 62.8 | 0.65 |

Thus embodiments of optical articles and systems including the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A system comprising:
one or both of a light emitter or a light receiver; and
an optical filter adjacent one or both of the light emitter or the light receiver, wherein the optical filter comprises at least one wavelength transmission selective layer comprising an absorber component, the absorber component comprising a metal chalcogenide or metal halide nanoparticle pigment, wherein the wavelength transmission selective layer at least partially reduces the transmission of wavelengths from 701 nm to 849 nm incident thereon, wherein the at least one wavelength transmission selective layer further comprises a plurality of respective selective scattering segments, and wherein an optical property of at least one of the plurality of respective selective scattering segments differs from a same optical property of at least another of the plurality of respective selective scattering segments.

2. The system according to claim 1, wherein the wavelength transmission selective layer at least partially allows the transmission of wavelengths other than from 701 nm to 849 nm.

3. The system according to claim 1, wherein the wavelength transmission selective layer transmits less than about 50% of wavelengths from 701 nm to 849 there through, transmits less than about 40% of wavelengths from 701 nm to 849 there through, transmits less than about 30% of wavelengths from 701 nm to 849 there through, transmits less than about 20% of wavelengths from 701 nm to 849 there through, or transmits less than about 15% of wavelengths from 701 nm to 849 there through.

4. The system of claim 1, wherein the optical filter comprises a reflective layer.

5. An article comprising an optical filter, wherein the optical filter comprises at least one wavelength transmission selective layer comprising an absorber component, the absorber component comprising a metal chalcogenide or metal halide nanoparticle pigment, wherein the wavelength transmission selective layer at least partially reduces the transmission of wavelengths from 701 nm to 849 nm incident thereon, wherein the at least one wavelength transmission selective layer further comprises a plurality of respective selective scattering segments, and wherein an optical property of at least one of the plurality of respective selective scattering segments differs from a same optical property of at least another of the plurality of respective selective scattering segments.

6. The article according to claim 5, wherein the wavelength transmission selective layer at least partially allows the transmission of wavelengths other than from 701 nm to 849 nm.

7. The article according to claim 5, wherein the wavelength transmission selective layer transmits less than about 50% of wavelengths from 701 nm to 849 therethrough, transmits less than about 40% of wavelengths from 701 nm to 849 therethrough, transmits less than about 30% of wavelengths from 701 nm to 849 therethrough, transmits less than about 20% of wavelengths from 701 nm to 849 therethrough, or transmits less than about 15% of wavelengths from 701 nm to 849 therethrough.

8. The article according to claim 5, wherein the optical filter comprises a reflective layer.

9. The article according to claim 5, wherein the optical filter is configured to camouflage one or both of the light receiver or the light emitter from a visual perception.

10. The article according to claim 5, wherein the optical filter appears black.

11. An article comprising an optical filter, wherein the optical filter comprises at least one wavelength transmission selective layer comprising an absorber component, the absorber component comprising a metal chalcogenide or metal halide nanoparticle pigment, wherein the wavelength transmission selective layer at least partially reduces the transmission of wavelengths from 701 nm to 849 nm incident thereon, wherein the at least one wavelength transmission selective layer further comprises a plurality of respective selective scattering segments, and wherein an optical property of at least one of the plurality of respective selective scattering segments differs from a same optical property of at least another of the plurality of respective selective scattering segments, wherein the optical filter is positioned adjacent an object that reflects near infrared (NIR) wavelengths.

* * * * *

UNITED STATES PATENT AND TRADEMARK OFFICE
CERTIFICATE OF CORRECTION

PATENT NO. : 11,619,771 B2
APPLICATION NO. : 16/652996
DATED : April 4, 2023
INVENTOR(S) : Neeraj Sharma Page 1 of 1

It is certified that error appears in the above-identified patent and that said Letters Patent is hereby corrected as shown below:

In the Claims

Column 14
Line 48, In Claim 3, after "849" insert --nm--.
Line 50, In Claim 3, after "849" insert --nm--.
Line 51, In Claim 3, after "849" insert --nm--.
Line 52, In Claim 3, after "849" insert --nm--.
Line 54, In Claim 3, after "849" insert --nm--.

Column 15
Line 9, In Claim 7, after "849" insert --nm--.
Line 11, In Claim 7, after "849" insert --nm--.
Line 12, In Claim 7, after "849" insert --nm--.
Line 13, In Claim 7, after "849" insert --nm--.
Line 15, In Claim 7, after "849" insert --nm--.

Signed and Sealed this
Nineteenth Day of December, 2023

Katherine Kelly Vidal
*Director of the United States Patent and Trademark Office*